Feb. 5, 1957 J. P. NEY 2,780,232
GATE-TYPE FLOW REGULATORS WITH CLEANING ORIFICES
Filed Dec. 8, 1951
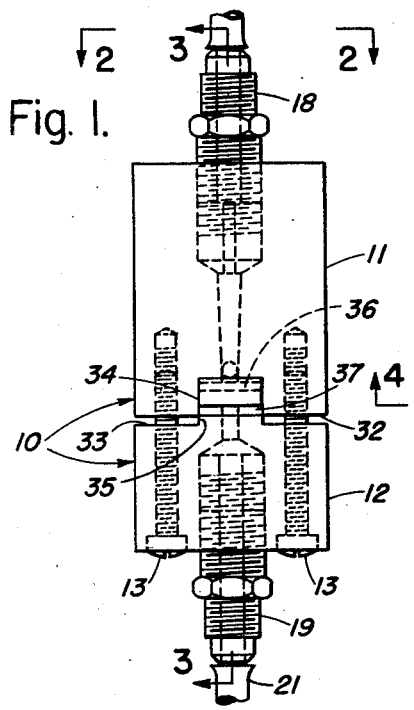
Fig. 1.
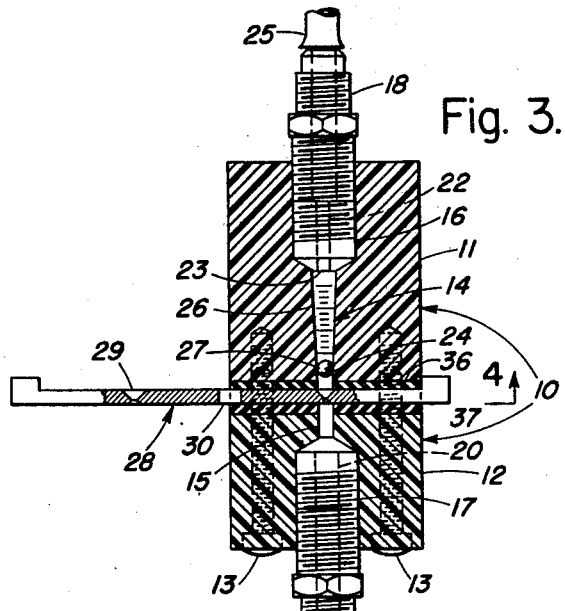
Fig. 3.
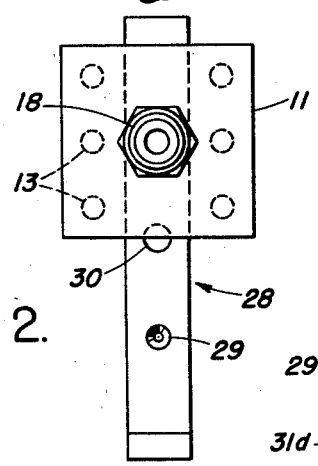
Fig. 2.
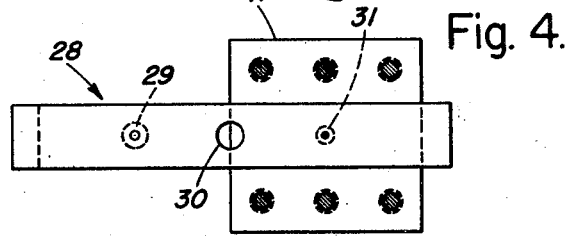
Fig. 4.
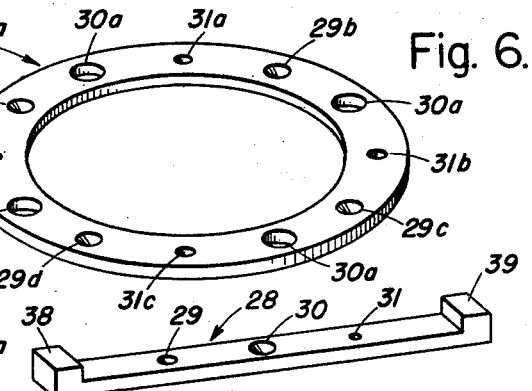
Fig. 6.
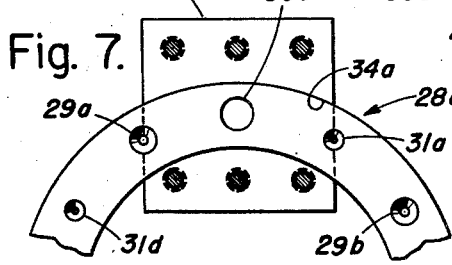
Fig. 7.
Fig. 5.
INVENTOR
John P. Ney
BY
Charles F. Kaegebehn
ATTORNEY

2,780,232

GATE-TYPE FLOW REGULATORS WITH
CLEANING ORIFICES

John P. Ney, Lemay, Mo.

Application December 8, 1951, Serial No. 260,591

1 Claim. (Cl. 137—238)

The present invention relates in general to fluid flow regulating devices and, more especially, to improved flow regulating means to facilitate cleaning and purging flow regulating devices.

In devices of this type and especially flow regulators having a valve orifice of relatively small size for regulating the flow of fluid therethrough, the orifice frequently becomes clogged by deleterious materials suspended in the fluid. When this happens the fluid flow must be shut off and the valve structure disassembled for cleaning with the result that there is considerable loss in down-time and in the time required to readjust the valve.

An object of the present invention is to provide a superior fluid flow regulator which may be cleaned and purged with facility and dispatch.

A further object of the invention is to provide a superior fluid flow regulator wherein the flow regulating-means may be cleaned without appreciable stoppage in the flow of fluid through the regulator.

A still further object of the invention is to provide an improved fluid flow regulator having an orifice plate provided with a plurality of flow regulating orifices so arranged that a clogged orifice may be made accessible for cleaning substantially simultaneously with the introduction of a clean orifice into the fluid passage of the regulator.

A further object of the invention is to provide a fluid flow regulator wherein the fluid passage of the regulator may be purged of deleterious materials by the admission of a relatively large flow of fluid therethrough.

With the above and other objects in view, as will appear to those skilled in the art from the present disclosure, this invention includes all features in the disclosure which are novel over the prior art and which are not claimed in any separate application.

In the accompanying drawings in which certain modes of carrying out the present invention are shown for illustrative purposes:

Fig. 1 is a front elevation of the fluid flow regulator of this invention;

Fig. 2 is a top plan view of the regulator of Fig. 1;

Fig. 3 is a side elevation in section of the regulator on line 3—3 of Fig. 1 showing one of the apertures of the flow regulating-means in operating position;

Fig. 4 is an end view of one of the complementary parts of the regulator as viewed in the direction of the arrows 4—4 of Fig. 3 showing the orifice plate in the guide-groove thereof;

Fig. 5 is a perspective view of the orifice plate of the regulator;

Fig. 6 is a perspective view of a modified form of orifice plate; and

Fig. 7 is an end view of one of the complementary parts of the regulator similar to Fig. 4 but modified to accommodate the orifice ring of Fig. 6.

Referring to the drawings, a preferred embodiment of the improved fluid flow regulator of this invention comprises a unitary body-member, indicated generally at 10, which in the embodiment shown is in the form of a parallelepiped constructed of a relatively tough substantially transparent material such as, for example, Lucite or an equivalent plastic. As shown in Figs. 1 and 2, the body-member is substantially square in cross section and its length is approximately twice its width. It will be appreciated, however, that the configuration of the body-member is primarily a matter of design and may be varied to meet requirements for economy, installation specifications, and similar considerations all of which are within the purview of the invention.

The unitary body-member 10 of the regulator comprises two separable complementary parts 11 and 12, the former, hereinafter referred to as the top-part 11, being substantially twice the length of the latter, which is hereinafter referred to as the bottom-part 12 of the body-member. The top-part 11 is adapted to be detachably secured to the bottom-part 12 by means of a plurality of fastening elements such as, for example, assembling screws 13 shown in Figs. 1 and 3.

The body-member 10 is provided with a fluid passage which extends therethrough coaxial with the longitudinal axes thereof and comprises axially aligned bores 14 and 15 respectively of relatively small diameter formed in the top and bottom parts of the body-member. As shown especially well in Fig. 3, one end, hereinafter referred to as the outer end of each bore, is formed with an internally threaded counterbore to receive an axially apertured screw plug 16 and 17 respectively; and a nipple or equivalent fitting, indicated at 18 and 19 respectively. The diameter of the axial aperture 20 in the lower plug 17 is greater than the diameter of the axial passage 15 in the bottom-part of the body-member and corresponds substantially to the diameter of the bore of the corresponding nipple 19 by which this end of the unit is connected to a pipe line indicated schematically at 21. The diameter of the axial aperture 22 in the screw plug 16 is less than the diameter of the upper end of the axial passage 14 in the top-part 11 of the unit thereby forming an annular constriction 23 which constitutes stop-means for preventing egress of a floating-type ball therefrom as hereinafter described. In this connection, it will be noted that the fluid passage 14 is slightly tapered throughout its length and that the diameter of the lower end of the passage is slightly less than the diameter of the hereinafter described floating-type ball so as to form an annular constriction as at 24 which constitutes stop-means at the lower end of the fluid passage to prevent egress of the floating-type ball therefrom. The upper nipple 18 is used for detachably securing the upper end of the unit to a pipe line indicated schematically at 25.

It will be noted that the length of the visible tapered portion of the bore 14 of the top-part 11 of the body-member exceeds the length of the bore 15 of the bottom-part 12. This construction is preferred so that the tapered portion of the bore, which is indicated at 26 may constitute, in effect, a gauge glass. In this respect the gauge glass 26 may be provided with index marks characteristic of a flow-meter, or similar instrument. However, the indexing of the gauge glass 26 is not essential to the operation of the regulator. The aforementioned floating-type ball or equivalent device is indicated at 27 and constitutes an indicator which is mounted in the gauge glass portion 26 of the bore 14 for freedom of movement longitudinally therein, the floating-type ball 27 being positively restrained from moving beyond opposite ends respectively of the gauge glass by the above identified stop-means or constrictions which permit substantially free flow of the fluid through the fluid passage of the body-member but prevent the indicator ball 27 from escaping from either end of the gauge glass portion 26 of the fluid passage.

The orifice plate of the regulator is indicated generally at 28 and is provided with a plurality of orifices 29, 30 and 31 so arranged that when the orifice plate is moved relative to the fluid passage 14 of the regulator at least one orifice may be brought into alignment with the fluid passage to regulate the flow of fluid therethrough, while a second orifice of the plate is thereby moved in a position exteriorly of the body-member of the regulator to permit the second orifice to be cleaned.

The orifice plate 28 of the regulator is adapted to be slidably mounted between the opposed inner faces 32 and 33 respectively of the top and bottom parts of the body-member for movement substantially transversely of the fluid passage 14 therein, and to these ends the inner faces 32 and 33 of the top and bottom parts of the body-member are provided with orifice plate guide-means. Referring to Fig. 1 the latter comprises a guide-groove 34 substantially U shaped in cross section and extending transversely of the inner-face 32 of the top-part 11 of the body-member, the longitudinal axis of the guide-groove intersecting the longitudinal axis of the fluid passage 14. The inner-face 33 of the bottom-part 12 of the body-member is provided with a raised portion or rib 35 which extends transversely thereof, its width corresponding substantially to, but preferably slightly less than, the width of the guide-groove 34 in the top-part of the body-member 11; and its longitudinal axis being substantially coincident therewith. The height of the rib 35 is a fraction of the depth of the guide-groove 34 and serves, in a manner hereinafter described, to hold the adjacent inner-faces of the top and bottom parts respectively of the body-member in vertically-spaced relationship so as to provide for adjustment thereof to and from each other and insure a fluid tight seal between the orifice plate and the guide-groove of the regulator. In this connection, the orifice plate 28 is adapted to be slidably mounted between two strips of sealing material 36 and 37 respectively which may consist of graphite impregnated or rubber-like material. The bottom sealing strip 37 is supported on the raised rib 35 of the bottom-part while the upper sealing strip 36 is engaged against the top wall of the guide-groove 34, both sealing strips being provided with apertures in alignment with the fluid passage 14 of the regulator.

The aforesaid orifice plate 28 is shown especially well in Fig. 5 and comprises a substantially rectangular metal blade-like member, the overall length of which is substantially twice the width of the regulator, and the width of which corresponds substantially with the width of the guide-groove 34 in the top-part 11 thereof. The orifice-plate 28 is of predetermined thickness such that the combined thicknesses of the two sealing strips 36 and 37 and the orifice plate 28 corresponds substantially to the depth of the guide-groove 34. Thus upon assembling the orifice plate in the guide-groove of the top-part of the regulator between the two sealing strips these elements will be retained in the guide-groove by engagement of the raised rib 35 of the bottom-part 12 against the bottom sealing strip. As is clear from the drawings, the bottom-part 12 and, in particular, its inner face 33, is spaced vertically from the inner face of the top-part 11 of the body-member whereby upon adjusting the assembling screws 13 of the regulator, the top and bottom parts respectively of the regulator may be drawn together thereby forming a fluid tight seal between the sealing strips and orifice plate.

Referring especially to Figs. 3, 4 and 5, the fluid flow regulating orifices 29 and 31 respectively, of the orifice plate each comprise a relatively small aperture having a countersink in one face of the orifice plate. The aperture 30 intermediate the two fluid flow regulating orifices is a purging aperture the diameter of which corresponds substantially to the mean diameter of the fluid passage 14 of the regulator. Stop-means 38 and 39 respectively, are provided at each end of the orifice plate to limit the movement of the latter transversely of the longitudinal axis of the fluid passage 14, each stop-means comprising an upstanding protuberance or rib adapted upon engagement with the corresponding wall of the body-member to limit the movement of the orifice plate in the sealing groove thereof. Moreover, each stop-means is located, with reference to the fluid flow regulating orifice at the corresponding end of the orifice plate, such that its respective regulating orifice will be substantially in axial alignment with the fluid passage 14 of the regulator when the stop-means is in abutting engagement with the corresponding wall thereof. In accordance with this construction, the orifice plate 28 may be moved manually through the regulator with facility and dispatch to bring either one of the flow regulating orifices of the plate selectively into alignment with the fluid passage. Nor is it necessary to give particular attention to adjusting the positions of the flow regulating orifices of the plate, the alignment of each respective flow regulating orifice being achieved automatically by engagement of its respective stop-means with the wall of the regulator. Moreover, as shown especially well in Fig. 1, the spacing of the flow regulating orifices adjacent the opposite ends respectively of the orifice plate is so related to the width of the regulator that when either one of the flow regulating orifices is in alignment with the fluid passage 14 of the regulator the other flow regulating orifice is disposed exteriorly of the body-member where it is readily accessible for cleaning.

In using the regulator to control the flow of fluid through a pipe line the regulator is detachably connected into a pipe line 21 and 25 by means of the fittings 18 and 19 secured in the opposite ends respectively of the fluid passage 14 of the regulator. By shifting the orifice plate 28 so as to bring either one of its flow regulating orifices 29 or 31 respectively into alignment with the fluid passage 14 of the regulator, the flow of fluid therethrough will be regulated in accordance with the diameter of the orifice in the orifice plate. Simultaneously, with the flow of fluid through the fluid passage, the indicator or floating type ball 27 will be carried upwardly in the gauge glass portion 26 of the fluid passage 14 to a height which is a measure of the velocity of fluid flowing through the fluid passage of the regulator. Should the flow regulating orifice become clogged by deleterious material suspended in the fluid then the floating-type ball will drop down from its elevated position in the gauge glass 26 of the fluid passage thereby indicating a stoppage of the flow of fluid therethrough. Upon recognizing this condition, an operator may slide the orifice plate through the regulator from one side thereof to the other. In so doing the purging aperture 30 of the plate is momentarily brought into alignment with the fluid passage of the regulator thereby permitting a relatively large flow of fluid to pass therethrough for purging the fluid passage of the regulator and freeing it of any deleterious material which may have accumulated therein. Thereafter, the second flow regulating orifice is brought into alignment with the fluid passage of the regulator, while the clogged flow regulating orifice is moved simultaneously to a position outside of the regulator where it is easily accessible for cleaning. In this position the clogged orifice may be cleaned with ease and without interference with the substantially continuous operation of the flow regulator.

A modification of the construction of the orifice plate of the regulator is shown in Figs. 6 and 7. In this form the regulator plate is a substantially flat arcuate ring-like member 28a having a plurality of flow regulating orifices of various sizes as indicated at 29a, 31a, 29b, 31b, 29c, 31c, 29d, 31d and purging apertures 30a. The mounting of this ring-like orifice plate in the regulator is similar to that of the orifice plate hereinabove described except that the guide-groove 34a for accommodating the ring-like orifice plate, and the sealing strips 36a and 37a are arcuate, the radii of which correspond substantially to the radius of the orifice plate. Fig. 7 shows the arcuate form of the guide-groove 34a in the inner face of the top-part 11a, of the regulator for accommodating a ring-like orifice plate. A similar arcuate rib 35a of substantially equal radius is formed on the inner face of the bottom part 12a of the regulator (not shown) and serves in a manner hereinabove described to hold the ring-like orifice plate with a substantially fluid tight fit between the two arcuate sealing-strips assembled in the arcuate guide-groove of the top-part of the regulator on opposite sides respectively of the orifice plate.

The operation of a regulator embodying the ring-like orifice plate is substantially the same as that of the regulator having a blade-like orifice plate except that the ring-like orifice plate may have a larger selection of flow regulating orifices. Moreover, a circular motion is given to the ring-like orifice plate for selectively transferring the respective orifices into axial alignment with the fluid passage of the regulator.

The fluid regulator of this invention is thus an inexpensive unitary device which may be readily assembled in a pipe line for regulating the flow of fluid therethrough; and is characterized by an orifice plate having fluid flow regulating orifices therein which may be selectively moved into operating position without effecting any substantial interruption in the flow of fluid through the fluid passage of the regulator; and flow regulating orifices which are so arranged that when either flow regulating orifice is in operating position the other orifice is readily accessible for cleaning.

While this invention has been described and illustrated by the examples shown, it is not intended to be strictly limited thereto and other modifications and variations may be employed within the scope of the following claim.

I claim:

A fluid flow regulating device comprising a body-member including two separable substantially solid blocks, each having a fluid passage extending axially therethrough and an internally threaded counterbore at its outboard end concentric with its fluid passage, and adjusting means arranged to hold said blocks in abutting relationship with the fluid passages of said respective blocks in axial alignment; pipe fittings threadedly engaged in the respective counterbores of said body-member to connect the corresponding ends of said fluid passages into a pipe line; a groove in the abutting face of one of said blocks; a rib in the abutting face of the adjacent block, said rib being arranged to engage in said groove and to form therewith a guide slot extending through said body members substantially transversely of said fluid passages; an orifice plate comprising a blade-like member slidably mounted in the transverse guide slot of said body member for movement relative thereto; sealing means interposed between said rib and said orifice plate for sealing said guide slot, said blade-like member having fluid-flow regulating orifices adjacent opposite ends thereof respectively and an unrestricted purging orifice intermediate said fluid-flow regulating orifices, said fluid-flow regulating orifices being spaced apart a distance substantially equal to the transverse dimension of said body-member such that when one flow-regulating orifice is moved into the fluid passage of said body member by movement of said blade-like member relative to said body-member for regulating the flow of fluid therethrough, the other fluid-flow regulating orifice will be moved simultaneously into a position exteriorly of said body member so as to be accessible for cleaning, said blade-like member being movable also into an intermediate position wherein each of said fluid-flow regulating orifices is displaced from said fluid passage and said purging orifice is positioned in said passage for purging the latter of foreign material; and stop means at opposite ends respectively of said blade-like member to limit the movement of said blade-like member transversely in the guide slot of said body-member, thereby to automatically position the respective fluid-flow regulating orifices in the fluid passage thereof.

References Cited in the file of this patent

UNITED STATES PATENTS

| | | |
|---|---|---|
| 721,821 | Myers | Mar. 3, 1903 |
| 1,217,899 | Barrus | Mar. 6, 1917 |
| 1,540,209 | Frazier | June 2, 1925 |
| 1,607,827 | Herrmann | Nov. 23, 1926 |
| 1,671,617 | Spitzglass | May 29, 1928 |
| 1,679,219 | Huff | July 31, 1928 |
| 1,910,752 | Coles | May 23, 1933 |
| 1,921,298 | Lewis | Aug. 8, 1933 |
| 2,136,261 | Anderson | Nov. 8, 1938 |
| 2,219,504 | Willis | Oct. 29, 1940 |